United States Patent
Burton et al.

(10) Patent No.: US 6,776,055 B2
(45) Date of Patent: Aug. 17, 2004

(54) MEASUREMENT OF FUEL FLOW

(75) Inventors: Carl Burton, Derby (GB); Christopher W Bradford, Ilkeston (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 10/461,448

(22) Filed: Jun. 16, 2003

(65) Prior Publication Data

US 2004/0007081 A1 Jan. 15, 2004

(30) Foreign Application Priority Data

Jul. 11, 2002 (GB) ............................................. 0216007

(51) Int. Cl.$^7$ .............................................. G01F 15/00
(52) U.S. Cl. .................................................. 73/861.77
(58) Field of Search ...................... 73/861.353, 861.77, 73/861.79, 660

(56) References Cited

U.S. PATENT DOCUMENTS

| | | |
|---|---|---|
| 1,366,551 A | 9/1921 | Eldec Corporation |
| 4,012,957 A | 3/1977 | Chiles |
| 4,193,739 A * | 3/1980 | Lucey ......................... 415/118 |
| 4,248,099 A | 2/1981 | Allen |
| 5,370,001 A | 12/1994 | LaBrecque |
| 5,866,824 A * | 2/1999 | Schieber ................... 73/861.79 |

* cited by examiner

*Primary Examiner*—Edward Lefkowitz
*Assistant Examiner*—Jewel V. Thompson
(74) *Attorney, Agent, or Firm*—W. Warren Taltavull; Manelli Denison & Selter PLLC

(57) ABSTRACT

A fuel mass flowmeter 10 includes a rotatable drum 22 through which fuel to be metered may pass and an impeller 24 mounted within the drum such that it may rotate relative thereto but is biased against such rotation by a spring 26. The drum 22 may be rotated as fuel is passed therethrough, the passage of the fuel past vanes 36 on the impeller causing the impeller to rotate relative to the drum 22, the extent of rotation depending upon the mass flow rate. The rate of rotation of the drum 22 is measured and a correction factor is applied to the measured mass flow rate, the magnitude of the correction factor depending upon the rate of rotation of the drum 22.

16 Claims, 4 Drawing Sheets

MEASUREMENT OF FUEL FLOW

FIELD OF THE INVENTION

The present invention relates to the measurement of fuel flow and particularly to the measurement of fuel flow in aircraft engines.

BACKGROUND OF THE INVENTION

In aircraft engines, a mass flow measurement device (flowmeter) is usually positioned immediately downstream of an engine fuel control unit in order to measure the engine consumed fuel mass flow rate. The fuel flowmeter typically contains a driver assembly and a measurement assembly. The driver assembly includes a turbine at the unit inlet, the flow of the fuel causing the turbine to rotate in a clockwise direction. The flowmeter is designed such that the turbine rotates at a generally constant speed independent of mass fuel flow.

Once the fuel has passed through the turbine, it enters a fixed straightener section where the swirl and flow aberrations are removed. When the fuel exits the straightener, it is therefore substantially straight and axial.

The fuel then enters the measurement assembly which is caused to rotate by the action of the turbine. The measurement assembly includes a shaft to which an enclosing drum is rigidly attached. The shaft is rotated by the turbine. The measurement assembly also includes an impeller which is located within the drum and is mounted for rotation on the shaft via precision bearings. The impeller is connected to the drum by a hairspring which resists relative rotational movement between the impeller and the drum, about the shaft.

As the mass of fuel flows into the rotating measurement assembly, it causes the hairspring mounted impeller to rotate (relative to the drum) as the fuel is caused to rotate. The angular displacement between the drum and the impeller is measured by two pick-off coils, one adjacent to the drum and the other adjacent to the impeller. As permanent magnets fixed to the drum and to the impeller rotate past the associated stationary pick-off coils, pulses are induced in each coil. The time ($\chi$t) between the respective pulses is a measure of mass fuel flow. Calibration is carried out under laminar flow conditions.

The above flowmeter suffers from inaccuracies, particularly at lower fuel flows, which includes cruise conditions where accuracy is particularly important. The errors are not systematic and may be higher or lower than the true reading.

SUMMARY OF THE INVENTION

According to the invention there is provided apparatus for metering fuel mass flow, the apparatus including:

a rotatable member through which fuel to be metered may pass;

a gauge associated with the rotatable member, for providing a measure of mass flow rate of fuel therethrough;

means for rotating the rotatable member as fuel is passed therethrough; and means for measuring the rate of rotation of the rotatable member and applying a correction factor to the measured mass flow rate, the magnitude of the correction factor depending upon the measured rate of rotation of the rotatable member.

Preferably the apparatus includes means for comparing the measured rate of rotation of the rotatable member with a nominal rate of rotation.

Preferably the apparatus includes means for rotating the rotatable member about an axis which is substantially parallel to the direction of movement of fuel through the rotatable member.

Preferably the gauge comprises a vane member rotatable with the rotatable member and capable of rotation relative to the rotatable member, about the axis, but biased against such relative rotation.

Preferably the vane member is freely mounted for rotation about the axis but is attached to the rotatable member via a spring which provides the bias.

The vane member may include a plurality of radially extending vanes, the vanes resisting rotational movement of the vane member relative to the fuel flowing through the rotatable member.

Preferably the relative rotational positions of the vane member and the rotatable member are representative of the mass fuel flow through the rotatable member.

Preferably the apparatus further includes a magnet mounted on the rotatable member and a stationary detector mounted adjacent the rotatable member, the detector providing an indication of each passage of the magnet and therefore of the rate of rotation of the rotatable member.

Preferably the apparatus further includes a magnet mounted on the vane member and a stationary detector mounted adjacent the vane member, the detector providing an indication of each passage of the vane member and therefore of the rate of rotation of the vane member.

The apparatus may further include means for comparing the signals from the respective detectors to provide an indication of the phase of the rotation of the vane member relative to the rotation of the rotational member and therefore of their relative angular positions.

Preferably the means for rotating the rotatable member includes a turbine comprising a plurality of aerofoils.

According to the invention there is further provided a method for metering fuel mass flow, the method including the steps of:

providing a rotatable member through which fuel to be metered may pass;

providing a gauge associated with the rotatable member, for providing an indication of mass flow rate of fuel therethrough;

rotating the rotatable member as fuel is passed therethrough; and measuring the rate of rotation of the rotatable member and applying a correction factor to the measured mass flow rate, the magnitude of the correction factor depending upon the rate of rotation of the rotatable member.

Preferably the method includes the step of comparing the measured rate of rotation with a known nominal rate of rotation of the rotatable member.

Preferably the correction factor also depends upon the measured mass fuel flow.

The correction factor may have been predetermined experimentally.

BRIEF DESCRIPTION OF THE DRAWINGS

An embodiment of the invention will be described for the purpose of illustration only with reference to the accompanying drawings in which.

DETAILED DESCRIPTION OF THE INVENTION

Figure 1A:
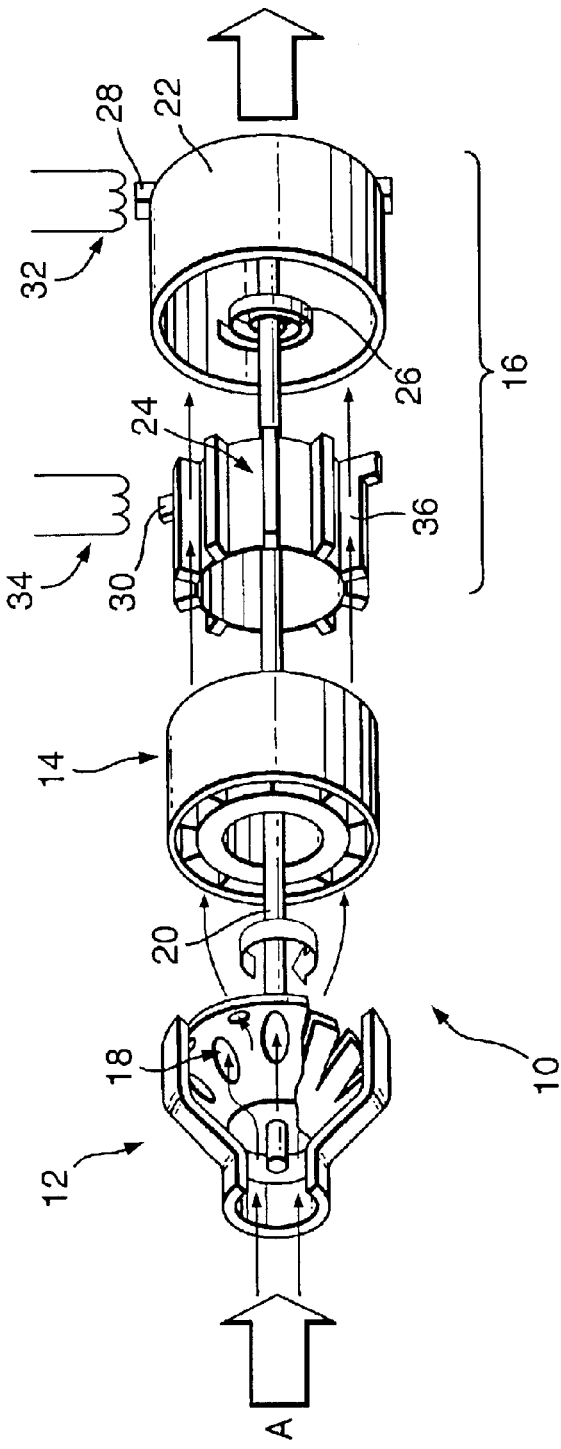
FIG. 1A is a diagrammatic exploded perspective view of part of a fuel flowmeter.

Referring to FIG. 1, there is illustrated a fuel flowmeter 10 which is a mass flow measurement instrument for measuring the mass flow of fuel in aircraft engines. Typically, the flowmeter 10 would be positioned immediately downstream of an engine fuel control unit in order to measure the mass of fuel consumed by the engine.

In broad terms the flowmeter 10 includes, moving from an upstream to a downstream end of the meter, a driver assembly 12, a straightener 14 and a measurement assembly 16.

The driver assembly includes a turbine 18 comprising a plurality of blades of aerofoil section. Fuel flowing through the driver assembly 12 causes the turbine 18 to rotate. The turbine 18 is rigidly attached to a shaft 20, the purpose of which is described below.

The straightener 14 is located directly downstream of the driver assembly 12. The straightener 14 is adapted to remove swirl and flow aberrations from the fuel passing therethrough.

The measurement assembly includes a substantially cylindrical drum 22 fixedly mounted for rotation on the shaft 20. The measurement assembly 16 also includes an impeller 24 which is located inside the drum 22 and which is also mounted to rotate about the shaft 20. However, whereas the drum 22 is rigidly attached to the shaft 20, the impeller 24 is mounted for rotation about the shaft 20, on precision bearings (not illustrated). It is thus clear that the impeller 24 is able to rotate relative to the drum 22. However, the impeller 24 is connected to the drum 22 via a hairspring 26. The hairspring resists relative rotational movement between the impeller 24 and the drum 22.

The impeller 24 includes a number of radially projecting vanes 36.

A permanent magnet 28 is located on an outer surface of the drum 22. A second permanent magnet 30 is located on the impeller 24. A stationary pick-off coil 32 is located adjacent to the drum 22 and a further pick-off coil 34 is located adjacent to the impeller 24. Each time the respective magnet 28, 30 passes the associated pick-off coil 32, 34, a pulse is generated in the coil.

In operation, fuel flows into the driver assembly 12 as indicated by the arrow A, causing the turbine 18 to rotate. The turbine 18 is designed such that it rotates at an approximately constant speed throughout a relatively wide range of different mass fuel flows.

The rotation of the turbine 18 causes the shaft 20 to rotate, which in turn causes the drum 22 to rotate at the same speed.

The fuel continues through the straightener 14 where swirl and flow aberrations are removed. Thus, when the fuel exits the straightener 14, its flow is substantially straight and axial.

The fuel then enters the measurement assembly 16. The drum 22 is rotating, because of the rotation of the turbine 18. Since the impeller 24 is attached to the drum 22 by the hairspring 26, the impeller 24 rotates with the drum 22.

As the fuel flows through the impeller, it bears against the surfaces of the vanes 36 and resists the rotation of the impeller 24. This causes a relative movement of the impeller 24 and the drum 22, against the bias of the hairspring 26. The extent of this movement is proportional to the mass fuel flow.

Figure 1C:
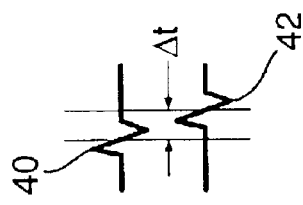
FIGS. 1B and 1C are diagrammatic representations of part of the flowmeter of FIG. 1A and of pulses produced by the flowmeter respectively.
Figure 1B:
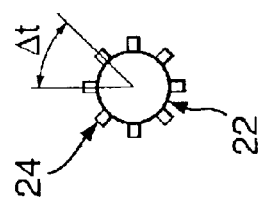

Referring to FIGS. 1B and 1C, as the magnet 28 on the drum 22 passes the pick-off coil 32, a pulse 40 is induced in the coil. Thus, one pulse is induced through each rotation of the drum 22. Similarly, a pulse 42 is induced each time the magnet 30 on the impeller 24 passes the pick-off coil 34. The time, ✕t, between the respective pulses for the drum 22 and impeller 24 is proportional to the angle between the drum and impeller and therefore to the mass flow rate of fuel. Thus, analysis of the pulses 40 and 42 in the coils 32 and 34 provides a measurement of the fuel mass flow rate. The pulses 40 and 42 are passed to the aircraft engine electronic control (EEC) for such analysis to take place.

Currently, the EEC does not measure the rate of rotation of the measurement assembly 16, but only the time ✕t, which provides the mass flow information.

Figure 2:
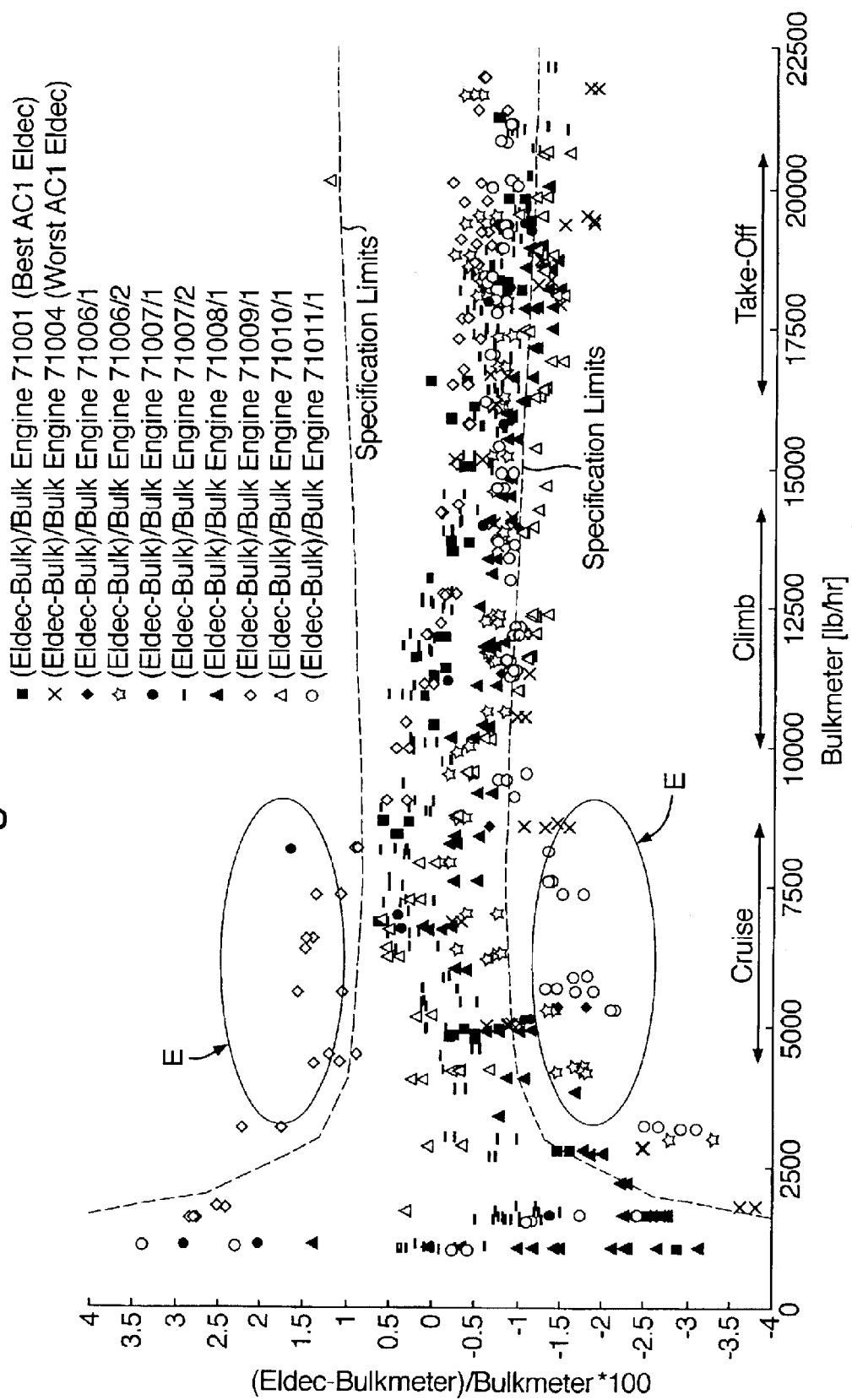
FIG. 2 is a graph of fuel flowmeter error against mass fuel flow rate according to the prior art arrangement.

The inventors have discovered various problems with the above described flowmeter 10. It has been found that non-systematic errors occur, which cannot be corrected with a simple off-set. The errors tend to be greatest at lower flow rates, which includes cruise conditions where accuracy is required most. FIG. 2 illustrates the flowmeter error (on the y axis) as a function of actual fuel mass flow (on the x axis). The acceptable specification limits are indicated by the dotted lines. It may be seen that errors occur under cruise conditions of between around 2,500 and 10,000 pounds per hour mass flow (in the areas labelled E). There is no obvious pattern to the errors, which may result in the flowmeter reading being too high or too low.

The inventors have appreciated that the above errors appear to be related to variations in the speed of rotation of the turbine 18 and therefore the measurement assembly 16. The flowmeter 10 would be calibrated on a test rig, where the fuel flow is laminar. However, in real engines, it has been discovered that fuel entering the flowmeter may be swirling in a spiral vortex. Depending upon the direction of the swirl, this may cause the turbine to rotate faster or slower than its supposed nominal speed. The inventors have appreciated that this is causing errors in the flowmeter reading.

Figure 4:
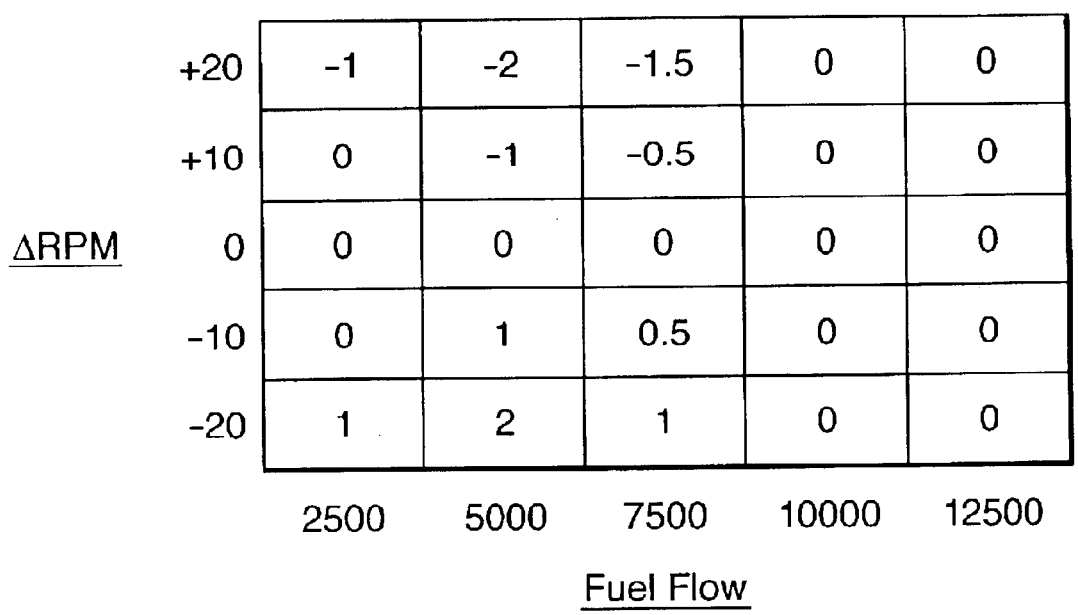
FIG. 4 is a look-up table used for applying correction factors according to the invention.

In an arrangement according to the invention, the signals from the pick-off coils 32 and 34 are analysed to provide an indication of the turbine rotational speed. Depending upon that speed, a correction factor is then applied to the fuel mass flow reading. FIG. 4 is a correction factor look-up table illustrating the percentage corrections to be applied for particular turbine rpms at particular mass fuel flow readings. The appropriate correction factors are determined experimentally.

Figure 3:
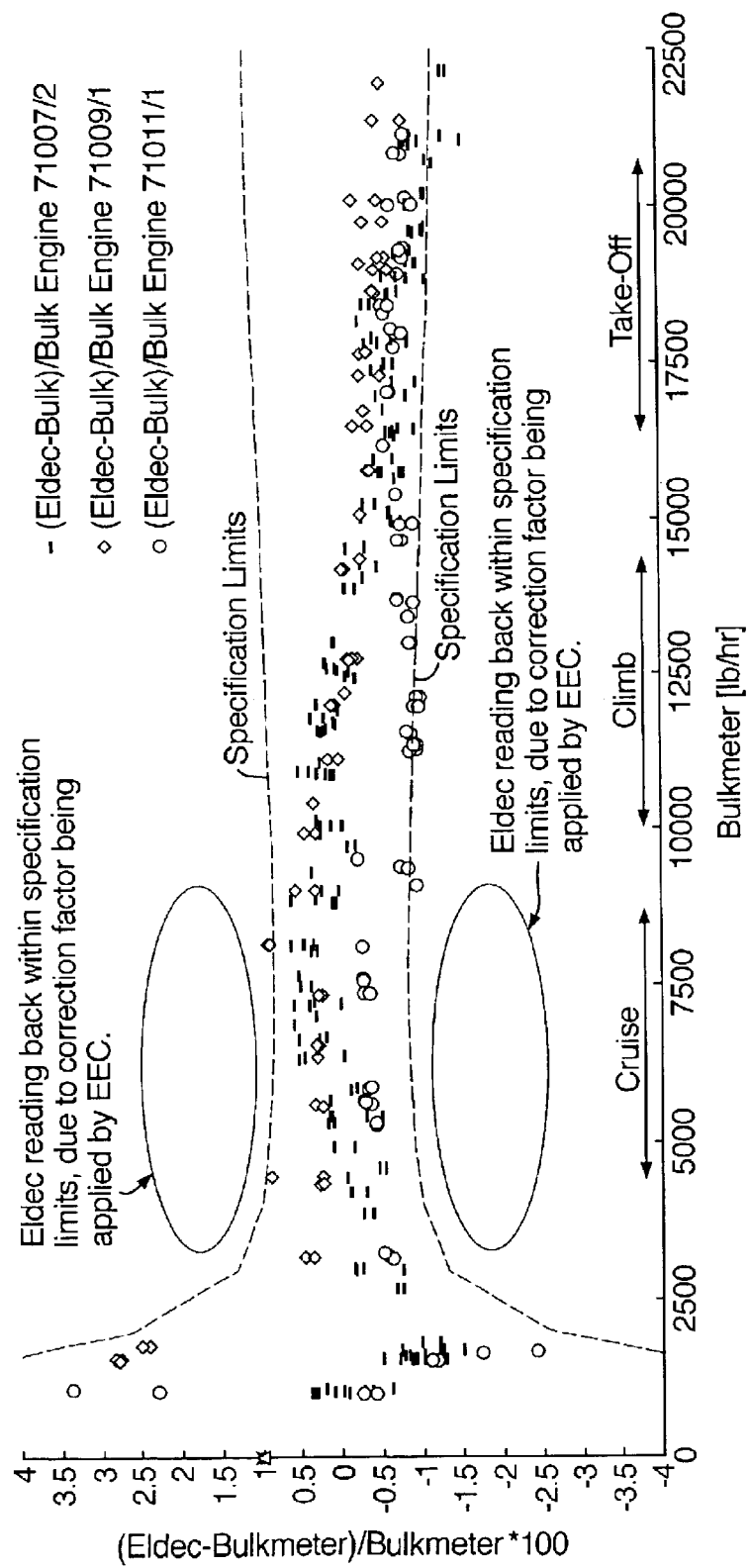
FIG. 3 is a similar graph to that of FIG. 2 but illustrating the error when the system of the invention is used.

FIG. 3 is an illustration similar to that of FIG. 2, but showing the mass flow readings after correction according to the invention. It may be seen that all the readings fall within the specification limits indicated by the dotted lines.

There is thus provided an apparatus and method for indicating mass fuel flow which provides improved accuracy.

Various modifications may be made to the above described embodiment without departing from the scope of the invention. For example, the spring 26 could be replaced with alternative biasing means and the drum could be caused to rotate by means other than a turbine.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. Apparatus for metering fuel mass flow, the apparatus including:
   a rotatable member through which fuel to be metered may pass;
   a gauge associated with the rotatable member, for providing a measure of mass flow rate of fuel therethrough;
   means for rotating the rotatable member as fuel is passed therethrough; and
   means for measuring the rate of rotation of the rotatable member and applying a correction factor to the measured mass flow rate, the magnitude of the correction factor depending upon the measured rate of rotation of the rotatable member, the apparatus including means for comparing the measured rate of rotation of the rotatable member with a nominal rate of rotation.

2. Apparatus according to claim 1, the apparatus including means for rotating the rotatable member about an axis which is substantially parallel to the direction of movement of fuel through the rotatable member.

3. Apparatus according to claim 1, wherein the gauge comprises a vane member rotatable with the rotatable member and capable of rotation relative to the rotatable member, about the axis, but biased against such relative rotation.

4. Apparatus according to claim 3, wherein the vane member is freely mounted for rotation about the axis but is attached to the rotatable member via a spring which provides the bias.

5. Apparatus according to claim 3, wherein the vane member includes a plurality of radially extending vanes, the vanes resisting rotational movement of the vane member relative to the fuel flowing through the rotatable member.

6. Apparatus according to claim 5, wherein the relative rotational positions of the vane member and the rotatable member are representative of the mass fuel flow through the rotatable member.

7. Apparatus according to claim 3, further including a magnet mounted on the rotatable member and a stationary detector mounted adjacent the rotatable member, the detector providing an indication of each passage of the magnet and therefore of the rate of rotation of the rotatable member.

8. Apparatus according to claim 7, further including a magnet mounted on the vane member and a stationary detector mounted adjacent the vane member, the detector providing an indication of each passage of the vane member and therefore of the rate of rotation of the vane member.

9. Apparatus according to claim 8, further including means for comparing the signals from the respective detectors to provide an indication of the phase of the rotation of the vane member relative to the rotation of the rotational member and therefore of their relative angular positions.

10. Apparatus according to claim 1, wherein the means for rotating the rotatable member includes a turbine comprising a plurality of aerofoils.

11. A method for metering fuel mass flow, the method including the steps of:
    providing a rotatable member through which fuel to be metered may pass;
    providing a gauge associated with the rotatable member, for providing an indication of mass flow rate of fuel therethrough;
    rotating the rotatable member as fuel is passed therethrough; and
    measuring the rate of rotation of the rotatable member and applying a correction factor to the measured mass flow rate, the magnitude of the correction factor depending upon the rate of rotation of the rotatable member.

12. A method according to claim 11, including the step of comparing the measured rate of rotation with a known nominal rate of rotation of the rotatable member.

13. A method according to claim 12, wherein the correction factor also depends upon the measured mass fuel flow.

14. A method according to claim 13, wherein the correction factor has been predetermined experimentally.

15. Apparatus for metering fuel mass flow, the apparatus including:
    a rotatable member through which fuel to be metered may pass:
    a gauge associated with the rotatable member, for providing a measure of mass flow rate of fuel therethrough;
    means for rotating the rotatable member as fuel is passed therethrough; and
    means for measuring the rate of rotation of the rotatable member and applying a correction factor to the measured mass flow rate, the magnitude of the correction factor depending upon the measured rate of rotation of the rotatable member,
    wherein the gauge comprises a vane member rotatable with the rotatable member and capable of rotation relative to the rotatable member, about the axis, but biased against such relative rotation
    wherein the vane member includes a plurality of radially extending vanes, the vanes resisting rotational movement of the vane member relative to the fuel flowing through the rotatable member.

16. Apparatus according to claim 15, wherein the relative rotational positions of the vane member and the rotatable member are representative of the mass fuel flow through the rotatable member.

* * * * *